United States Patent
Lin et al.

(10) Patent No.: US 9,982,462 B2
(45) Date of Patent: May 29, 2018

(54) RELEASE STRUCTURE OF SMART LOCK

(71) Applicant: BRAINCHILD ELECTRONIC CO., LTD., Taipei (TW)

(72) Inventors: Yi-Ching Lin, Taipei (TW); Shuang-Te Chang, Taipei (TW)

(73) Assignee: BRAINCHILD ELECTRONIC CO., LTD., Taipei (TW)

( * ) Notice: Subject to any disclaimer, the term of this patent is extended or adjusted under 35 U.S.C. 154(b) by 261 days.

(21) Appl. No.: 15/003,864

(22) Filed: Jan. 22, 2016

(65) Prior Publication Data
US 2017/0211295 A1 Jul. 27, 2017

(51) Int. Cl.
*E05B 47/06* (2006.01)
*E05B 47/00* (2006.01)
*H02K 7/116* (2006.01)
*F16H 19/00* (2006.01)

(52) U.S. Cl.
CPC .......... *E05B 47/06* (2013.01); *E05B 47/0012* (2013.01); *H02K 7/116* (2013.01); *E05B 2047/002* (2013.01); *E05B 2047/0069* (2013.01); *E05B 2047/0088* (2013.01); *F16H 19/001* (2013.01)

(58) Field of Classification Search
USPC ............................................. 292/144, 336.3
See application file for complete search history.

(56) References Cited

U.S. PATENT DOCUMENTS

| | | | | |
|---|---|---|---|---|
| 6,517,127 | B1 * | 2/2003 | Lu ....................... | E05B 47/0012 292/142 |
| 7,516,633 | B1 * | 4/2009 | Chang ................... | E05B 13/101 292/251.5 |
| 8,365,561 | B2 * | 2/2013 | Chang .................... | E05B 47/02 292/142 |
| 9,790,711 | B2 * | 10/2017 | McKibben .......... | E05B 47/0012 |
| 2003/0071471 | A1 * | 4/2003 | Lu ....................... | E05B 47/0012 292/144 |

(Continued)

FOREIGN PATENT DOCUMENTS

TW M386354 U 8/2010
TW M424380 U 3/2012

(Continued)

OTHER PUBLICATIONS

Office Action dated Sep. 19, 2016 of the corresponding Taiwan patent application.

*Primary Examiner* — Suzanne L Barrett
(74) *Attorney, Agent, or Firm* — Chun-Ming Shih; HDLS IPR Services

(57) ABSTRACT

A release structure of a smart lock includes a circuit unit, a drive unit, and a release element. The circuit unit and the drive unit are placed in a housing, and the drive unit is electrically connected to the circuit unit. The drive unit includes at least one push arm pivotally connected to a rotation pivot and enclosing the same. The release element is placed on the rotation pivot and includes at least one flexible arm placed corresponding to the push arm. The push arm is driven by the drive unit to rotatably contact the at least one flexible arm and cross it, so that the drive unit becomes idle. Accordingly, components in the drive unit are prevented from damages, and a lifespan of the smart lock is prolonged.

12 Claims, 9 Drawing Sheets

(56) References Cited

U.S. PATENT DOCUMENTS

| | | | | |
|---|---|---|---|---|
| 2004/0207214 A1* | 10/2004 | Lin | E05B 47/0012 | 292/336.3 |
| 2005/0050928 A1* | 3/2005 | Frolov | E05B 47/068 | 70/278.3 |
| 2007/0051145 A1* | 3/2007 | Chang | E05B 13/108 | 70/279.1 |
| 2008/0121001 A1* | 5/2008 | Huang | E05B 47/068 | 70/91 |
| 2009/0211320 A1* | 8/2009 | Wu | E05B 47/0012 | 70/277 |
| 2009/0229328 A1* | 9/2009 | Wu | E05B 47/0012 | 70/277 |
| 2010/0212381 A1* | 8/2010 | Huang | E05B 47/068 | 70/279.1 |
| 2012/0036904 A1* | 2/2012 | Chang | E05B 47/02 | 70/91 |
| 2013/0167598 A1* | 7/2013 | Huang | E05B 47/0012 | 70/278.1 |
| 2013/0192316 A1* | 8/2013 | McKibben | E05B 47/0001 | 70/278.1 |
| 2017/0122007 A1* | 5/2017 | Moon | E05B 47/0012 | |

FOREIGN PATENT DOCUMENTS

| | | |
|---|---|---|
| TW | M495398 U | 2/2015 |
| TW | M508580 U | 9/2015 |
| TW | M521103 U | 5/2016 |

\* cited by examiner

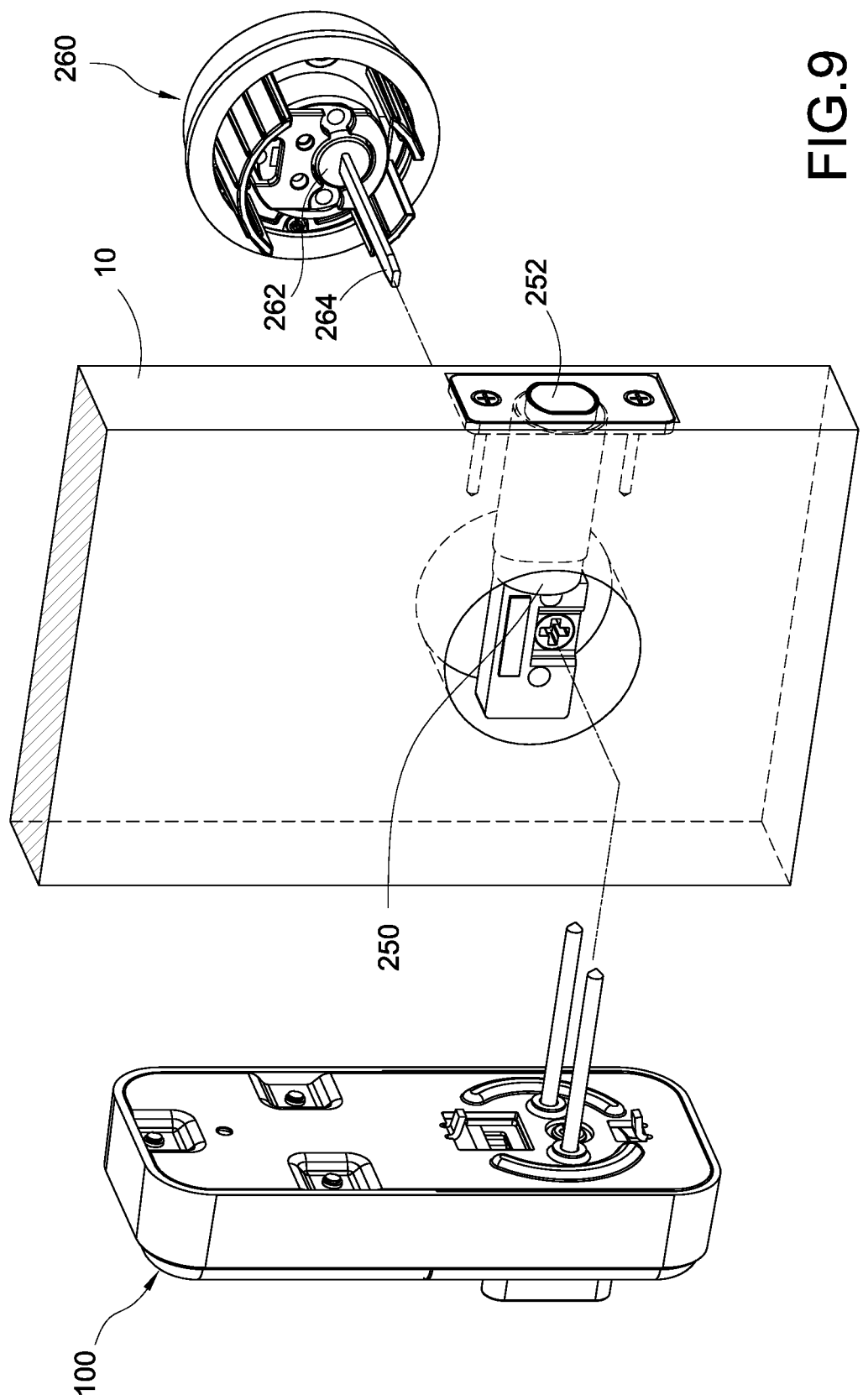

RELEASE STRUCTURE OF SMART LOCK

TECHNICAL FIELD

The present invention relates to a release structure and, in particular, to a release structure of a smart lock, which protects a drive unit from being damaged.

BACKGROUND

With rapid development of semiconductor technology, a door lock has developed toward an electrical-type lock device which not only obviates the inconvenience of carrying a key around, but also enhances home safety. Generally, the smart lock is categorized as follows: a combination lock unlocked by entering a password by pressing a series of numbers on the keypad; a sensor lock unlocked by means of a chip for proximity identification or a chip for insertion identification; and a lock unlocked by means of biometric identification (e.g. a user's fingerprint, retina or voice). The user can choose to use any type of smart lock according to his own requirements.

An electronic lock is powered by a motor. By means of a torque generated by the motor and transmitted via a gear set, a clutch mechanism of the electronic lock is driven to move to be engaged with or released from a latch assembly. However, when a movable lock tongue is not correspondingly engaged with a lock hole (i.e. the lock tongue knocks against a door frame or any position other than the lock hole), the motor continuously outputs the torque by means of the transmission of the gear set, thus resulting in damages to the motor. Therefore, after long-term use, the electronic lock very likely causes damages to the motor, and gears and other related parts could also be damaged during torque transmission using the gear set, so a lifespan of the electronic lock is shortened.

Accordingly, the inventor conducted various researches and experiments to solve the above-mentioned problems based on his experiences and research background in related field, on the basis of which the present invention is accomplished.

SUMMARY

It is an object of the present invention to provide a release structure of a smart lock, which prevents inner components in a drive unit from being damaged, thereby prolonging a lifespan of the smart lock.

Accordingly, the present invention provides a release structure of a smart lock, which includes a housing. The release structure comprises a circuit unit, a drive unit, and a release element. The circuit unit is accommodated in the housing. The drive unit is accommodated in the housing and electrically connected to the circuit unit. The drive unit includes at least one push arm pivotally connected to a rotation pivot and enclosing the same. The release element is disposed on the rotation pivot and includes at least one flexible arm. The flexible arm is disposed corresponding to the push arm. The push arm is driven by the drive unit to rotatably contact the at least one flexible arm and cross the same, so that the drive unit becomes idle.

It is preferable that the drive unit further includes a motor, a worm assembly pivotally connected to the motor, and a drive gear enclosing the rotation pivot, wherein the drive gear is engaged with the worm assembly, and the at least one push arm is disposed at one side of the drive gear.

It is preferable that the worm assembly further includes a screw rod connectedly driven by the motor, a driven shaft perpendicular to the screw rod, and a first gear disposed on the driven shaft, wherein the first gear is engaged with the screw rod, and the driven shaft and the rotation pivot are disposed parallelly.

It is preferable that the at least one flexible arm further includes a connection portion and an abutment portion extending from the connection portion, and the at least one push arm includes a wing portion and a push portion connected to the wing portion, wherein the push portion is in contact with the abutment portion.

BRIEF DESCRIPTION OF THE DRAWINGS

The disclosure will become more fully understood from the detailed description, and the drawings given herein below are for illustration only, and thus does not limit the disclosure, wherein:

FIG. 9 is an exploded view of the present invention, illustrating the release structure of the smart lock in combination with the exterior lock head.

DETAILED DESCRIPTION

Detailed descriptions and technical contents of the present invention are illustrated below in conjunction with the accompany drawings. However, it is to be understood that the descriptions and the accompany drawings disclosed herein are merely illustrative and exemplary and not intended to limit the scope of the present invention.

Figure 1:
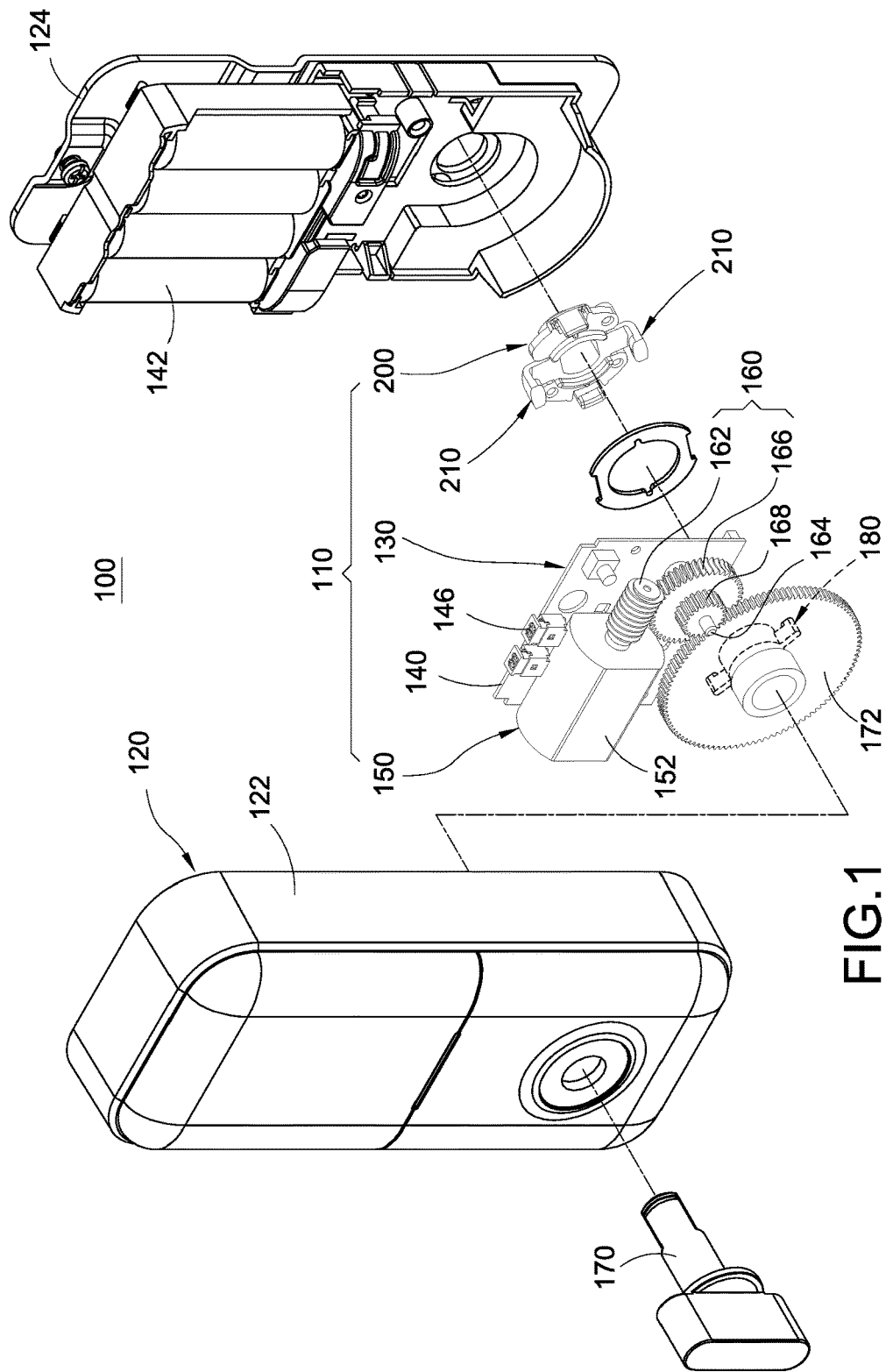
FIG. 1 is a perspective exploded view of a release structure of a smart lock according to the present invention.
Figure 2:
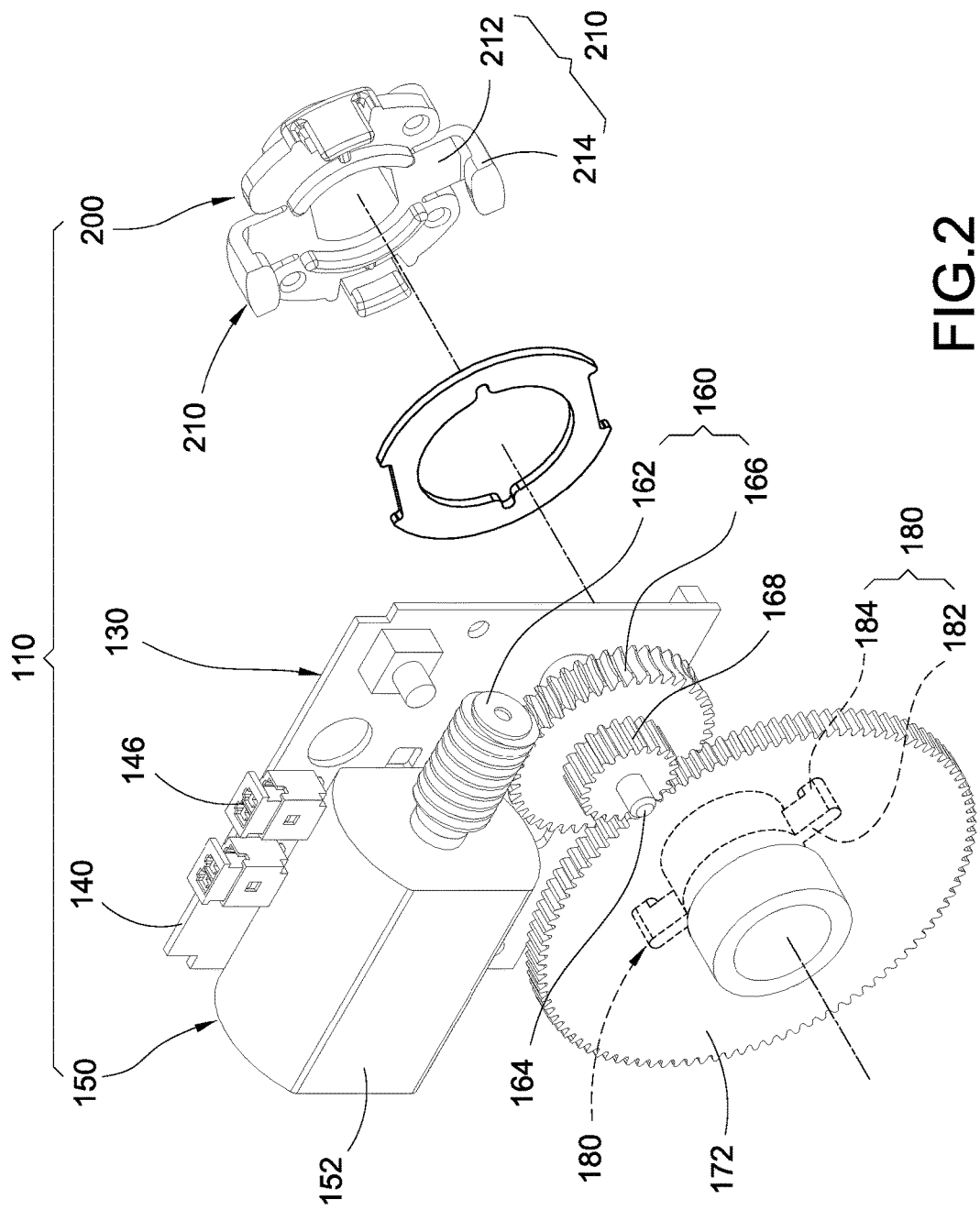
FIG. 2 is a perspective exploded view of the present invention, illustrating a drive unit and a release element.

Referring to FIGS. 1 and 2, the present invention provides a release structure 110 of a smart lock 100, the smart lock 100 having a housing 120. In the present embodiment, a release structure 110 is accommodated in the housing 120, wherein the housing 120 can be assembled by a first cover 122 and a second cover 124 or can be a single housing; the present invention is not limited in this regard. The release structure 110 includes a circuit unit 130, a drive unit 150, and a release element 200.

The circuit unit 130 is accommodated in the housing 120. The circuit unit 130 includes a circuit board 140, at least one connector 146 disposed at one side of the circuit board 140, and a plurality of power supply elements 142 connected to the circuit board 140 to supply power to the drive unit 150 or to achieve other functions such as storing and identifying biometric characteristics by a control module, and alerting by an alarm module when detecting insufficient power. The power supply elements 142 can be selected from a group consisting of a battery, a charge battery, a storage battery, or other suitable device. In addition, the circuit board 140 of the present embodiment is preferably a printed circuit board (PCB); however, in other embodiments, the circuit board 140 can also be a flexible printed circuit board or other suitable circuit board.

Figure 3:
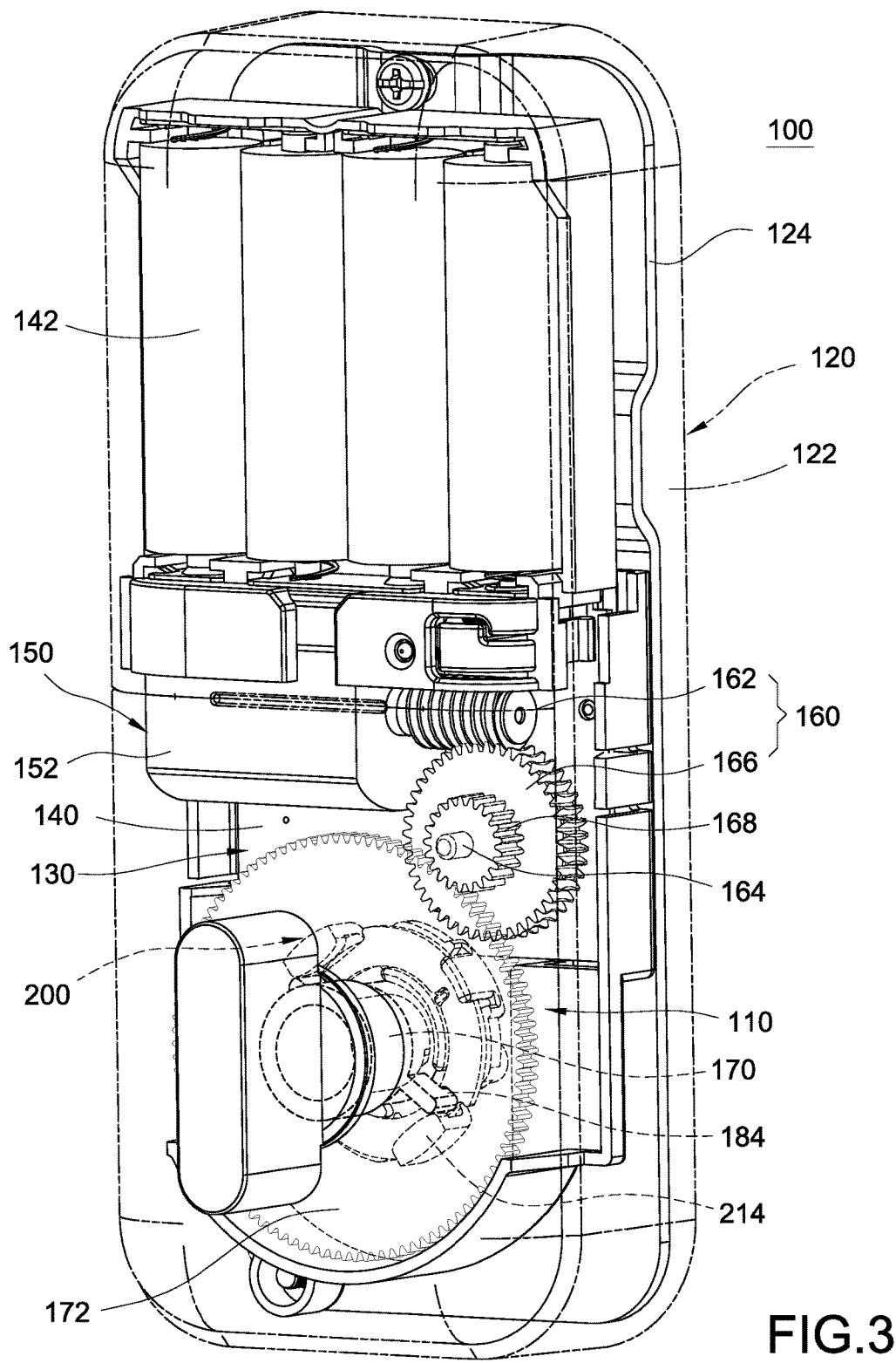
FIG. 3 is a transparent assembled view illustrating the release structure of the smart lock according to the present invention.
Figure 4:
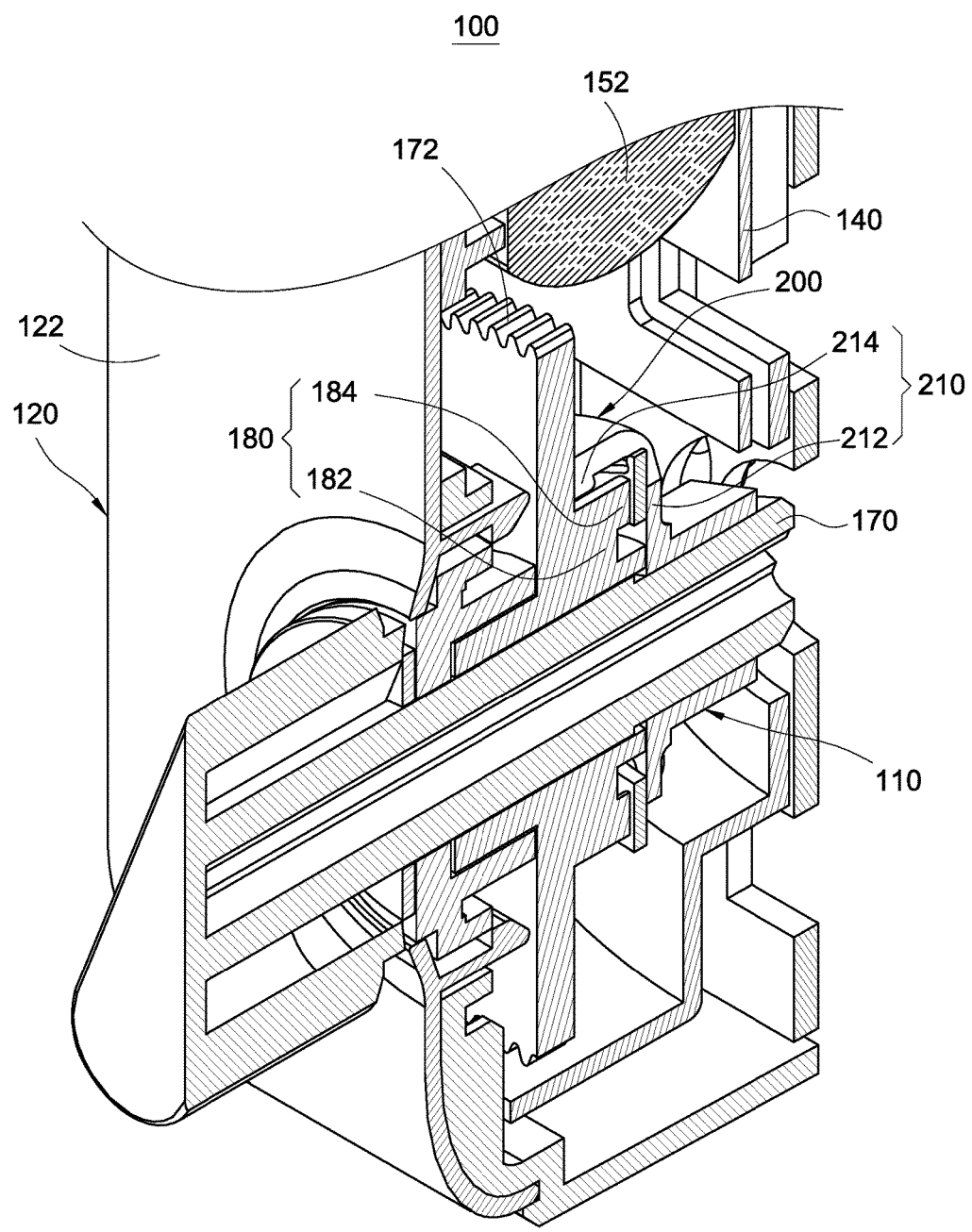
FIG. 4 is a perspective cross-sectional view of the present invention, illustrating a push arm contacting a flexible arm.

Referring to FIGS. 3 and 4, the drive unit 150 is accommodated in the housing 120 and is electrically connected to the circuit unit 130. The drive unit 150 includes at least one push arm 180 pivotally connected to a rotation pivot 170 and enclosing the rotation pivot 170. The push arm 180 can rotate along with the rotation pivot 170. The release element 200 is disposed on the rotation pivot 170 and includes at least one flexible arm 210, wherein the flexible arm 210 is disposed corresponding to the push arm 180.

In the present embodiment, the drive unit 150 further includes a motor 152, a worm assembly 160 pivotally connected to the motor 152, and a drive gear 172 enclosing the rotation pivot 170, wherein the drive gear 172 is engaged with the worm assembly 160, so that the power generated by the motor 152 can be transmitted via the drive gear 172. The at least one push arm 180 is disposed at one side of the drive gear 172, so that the at least one push arm 180 is rotatable along with the drive gear 172. The worm assembly 160 further includes a screw rod 162 connectedly driven by the motor 152, a driven shaft 164 perpendicular to the screw rod 162, and a first gear 166 enclosing the driven shaft 164, wherein the first gear 166 is engaged with the screw rod 162, and the driven shaft 164 and the rotation pivot 170 are disposed parallelly. Referring to FIGS. 2 and 3, the first gear 166 is fixedly connected to a second gear 168, the second gear 168 engagedly drives the drive gear 172, and the first gear 166 is sized between the drive gear 172 and the second gear 168. That is to say, the drive gear 172 is sized larger than the first gear 166, and the first gear 166 is sized larger than the second gear 168, so the drive gear 172 has the most teeth and rotates the slowest, and the second gear 168 has the least number of teeth and rotates the fastest. The first gear 166, the second gear 168, and the drive gear 172 are each preferably a spur gear. However, in other embodiments, the first gear 166, the second gear 168 and the drive gear 172 can be helical gears or other suitable gears.

The worm assembly 160 serves to reduce the high rotational speed of the motor 152, and the torque of the drive unit 150 is increased by means of the drive gear 172 engagedly driven by the second gear 168, and thereby a lock tongue (not illustrated) can movably extend out/retract to be engaged with or be released from a lock hole (not illustrated).

In the present embodiment, there are preferably multiple push arms 180 and multiple flexible arms 210 existing in pairs and disposed symmetrically, so as to achieve stable power transmission or a stable release action. To give an example for the purpose of describing the present embodiment, only one push arm 180 and only one flexible arm 210 are described hereinafter. However, in other different embodiments, the number of the push arms 180 and the number of the flexible arms 210 may be three or more, the number varying depending on requirement.

Figure 5:
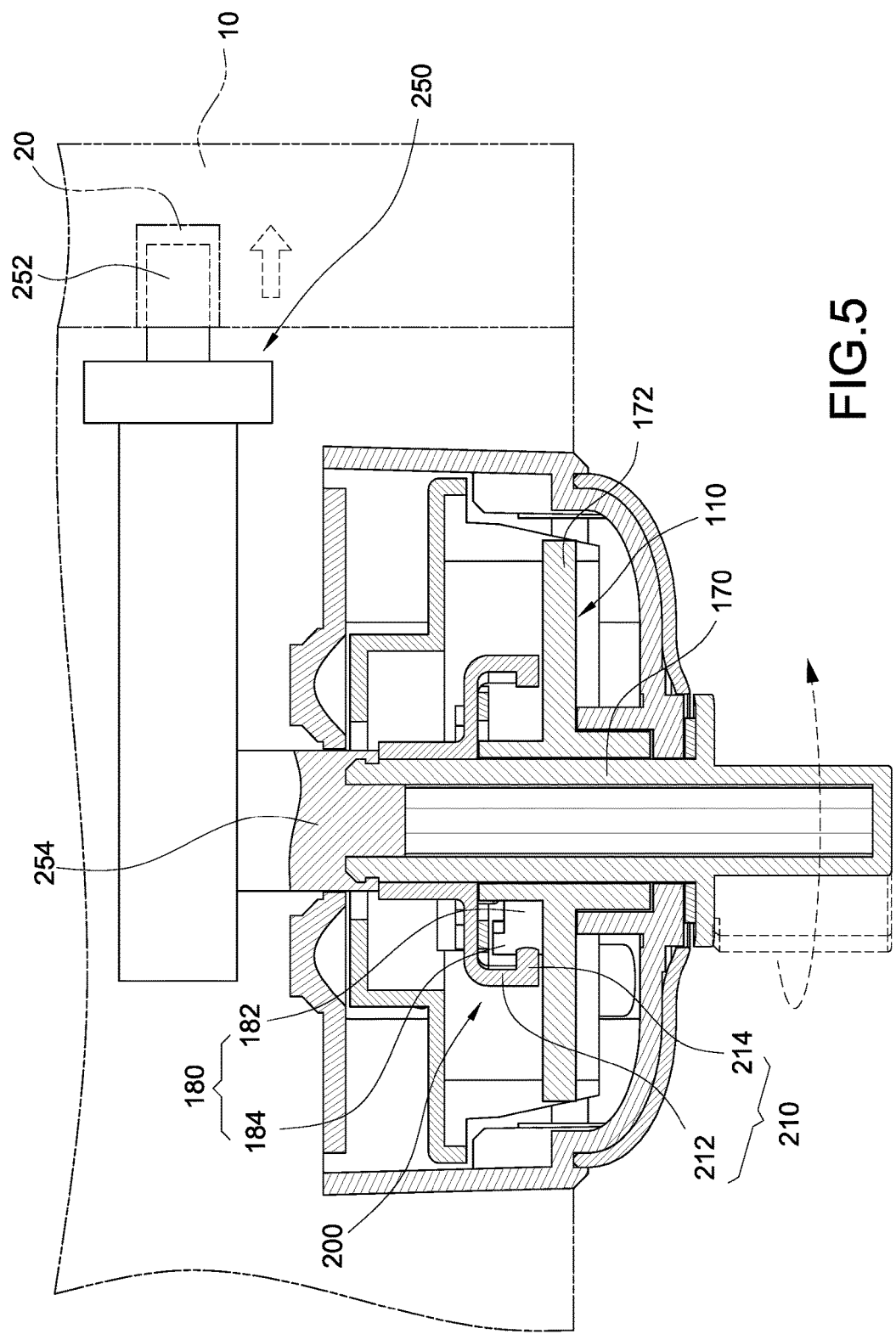
FIG. 5 is a cross-sectional view illustrating the release structure of the smart lock according to the present invention.
Figure 6:
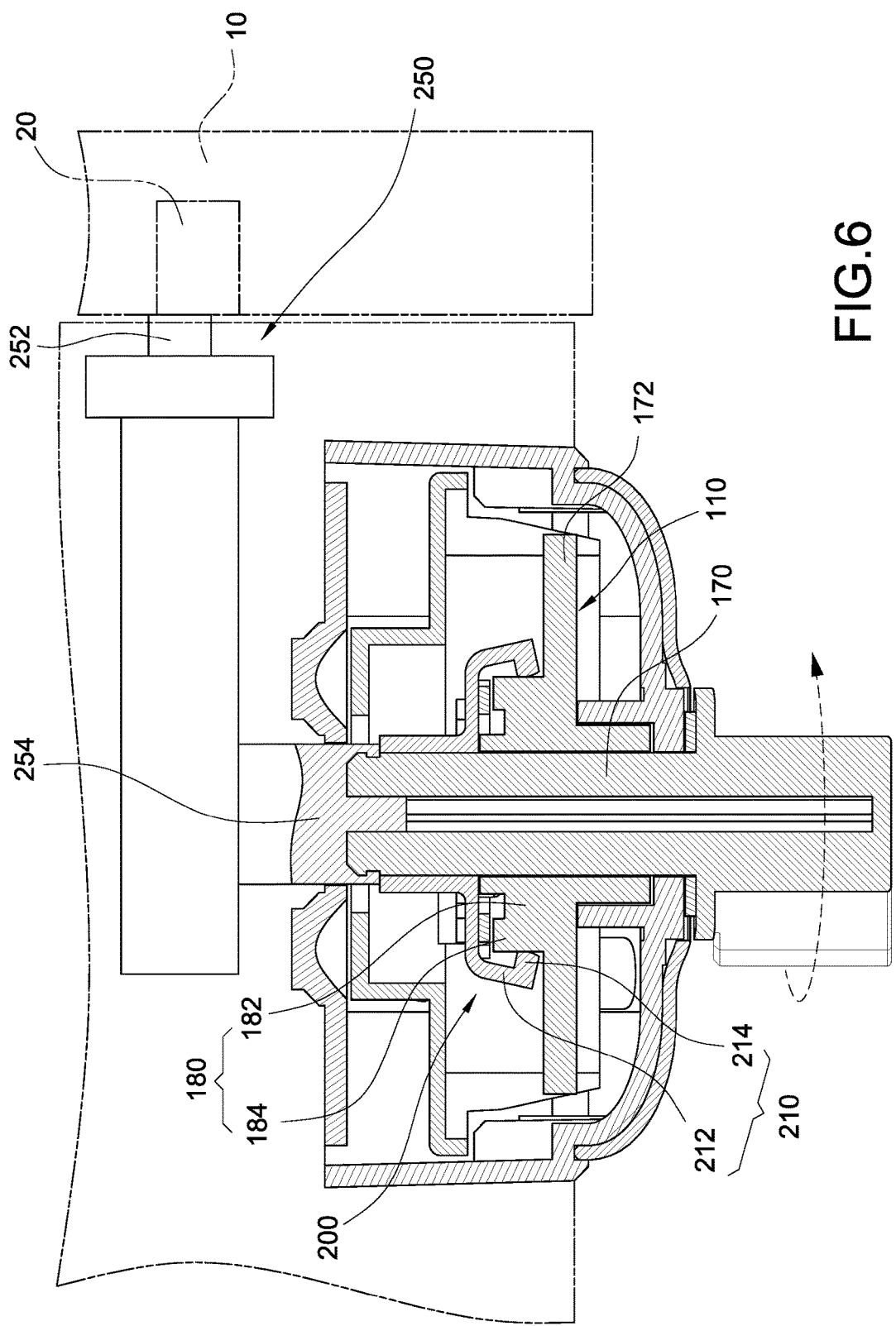
FIG. 6 is another cross-sectional view illustrating the release structure of the smart lock according to the present invention.

Referring to FIGS. 5 and 6, the flexible arm 210 further includes a connection portion 212 and an abutment portion 214 extending from the connection portion 212. The push arm 180 includes a wing portion 182 and a push portion 184 connected to the wing portion 182. The push portion 184 is in contact with the abutment portion 214. The length from the push portion 184 to the wing portion 182 is less than or equal to the length from the abutment portion 214 to the connection portion 212, so that the push arm 180 is rotatable in the disk-shaped release element 200 to drive the flexible arm 210 to rotate. Furthermore, the connection portion 212 is perpendicularly connected to the abutment portion 214, and one side of the wing portion 182 is integrally fixed to an outer side surface of the drive gear 172.

The present embodiment further includes a latch unit 250 for engagement with all kinds of doors 10 having a lock hole 20, the door being a front door, a room door, or an automatic door for example. The lock hole 20 can be formed directly in the door 10 itself; in addition to that, by means of an auxiliary element (not illustrated), the lock hole 20 can be defined between the auxiliary element and the door 10. The latch unit 250 includes a lock tongue 252 and a drive pillar 254 connected to the lock tongue 252. The rotation pivot 170 is connected to one end of the drive pillar 254 to drive the drive pillar 254 to rotate together, thereby movably driving the lock tongue 252 to move. Therefore, when the release element 200 rotates a suitable angle (not illustrated) along with the push arm 180, the drive pillar 254 is driven to rotate, so that the lock tongue 252 is brought into engagement with or released from the lock hole 20. The structure detail of the latch unit 250 belongs to conventional technique, and thus detailed descriptions are omitted herein for brevity.

When the lock tongue 252 of the latch unit 250 is accurately in the lock hole 20, the push arm 180 of the drive unit 150 rotatably contacts the flexible arm 210 of the release element 200 to drive the flexible arm 210 to rotate. At this point, the rotation pivot 170 rotatably drives the drive pillar 254 to bring the lock tongue 252 to extend out or retract inwardly. Therefore, the power generated by the motor 152 of the drive unit 150 is completely transmitted away upon termination of the extending or retracting operation of the lock tongue 252; that is to say, the door comes to a normal closed state or a normal open state as shown in FIG. 5.

As shown in FIG. 6, when the lock tongue 252 of the latch unit 250 is not accurately in the lock hole 20, the motor 152 of the drive unit 150 still outputs power continuously; the moment this occurs, since the torque of the push arm 180 excels the structural rigidity of the flexible arm 210 of the release element 200, so that the push arm 180 rotatably contacts and crosses the flexible arm 210 of the release element 200, thereby rendering the motor 152 of the drive unit 150 run idle to protect it from being damaged. Accordingly, the interior components, such as the worm assembly 160, the drive gear 172 and the second gear 168, in the motor 152 or in the drive unit 150 can operate smoothly, thus prolonging the lifespan of the smart lock 100.

In other words, when the push arm 180 rotatably contacts and crosses the flexible arm 210 of the release element 200, the flexible arm 210 is resiliently stretched out, so the push arm 180 can easily cross the connection portion 212, and as a result, the interior components in the motor 152 or the drive unit 150 are protected from being damaged, as shown in FIG. 6.

It should be noted that, in order for the push arm 180 to cross the flexible portion 210 with ease, either the abutment portion 214 or the push portion 184 which are disposed corresponding to each other has one side shaped to include a chamfered portion, an arc portion, an inclined surface, or other suitable shape, so that the push portion 184 can cross the abutment portion 214 much more easily.

Figure 7:
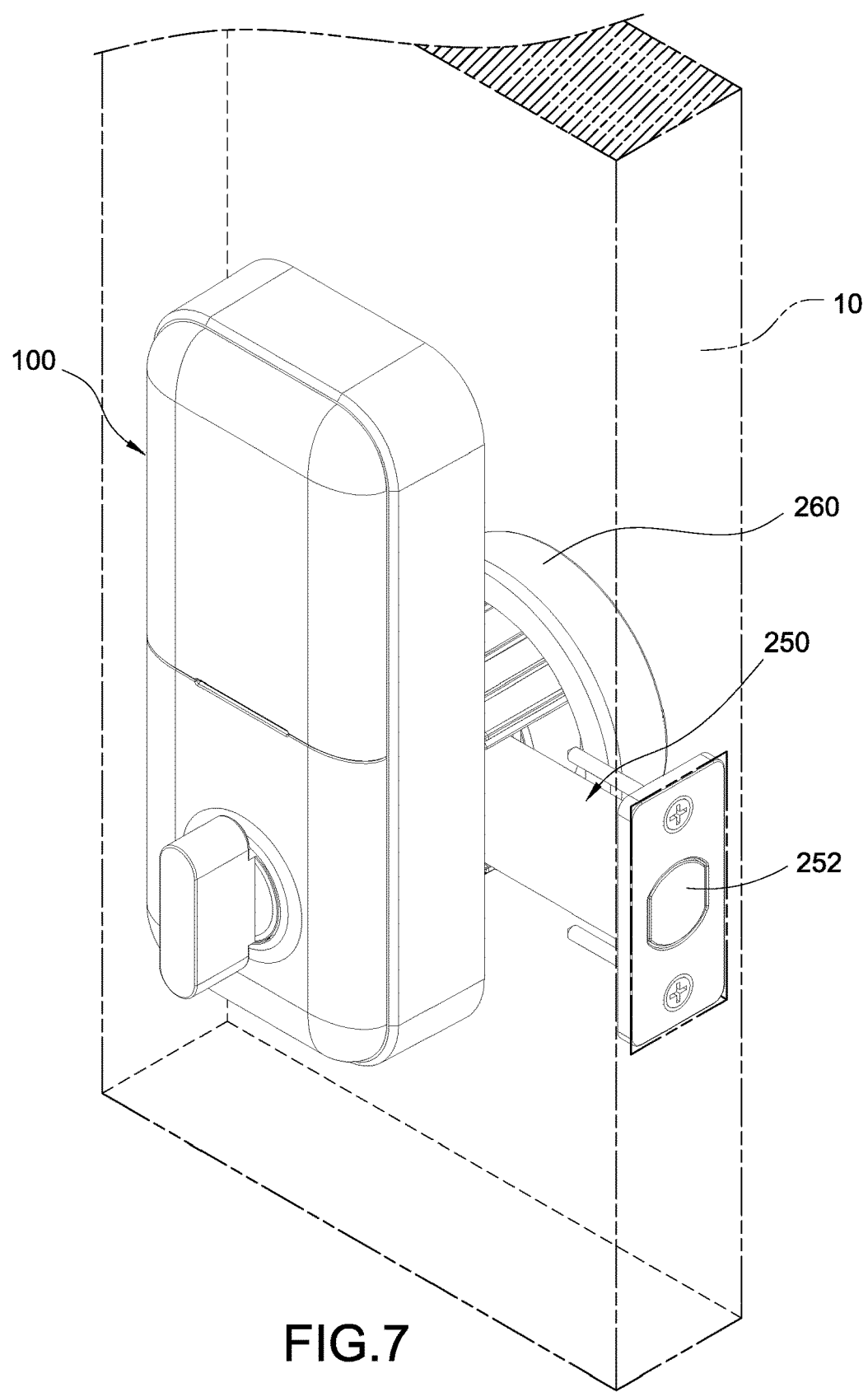
FIG. 7 is a perspective view of the present invention, illustrating the release structure of the smart lock in combination with an exterior lock head.
Figure 8:
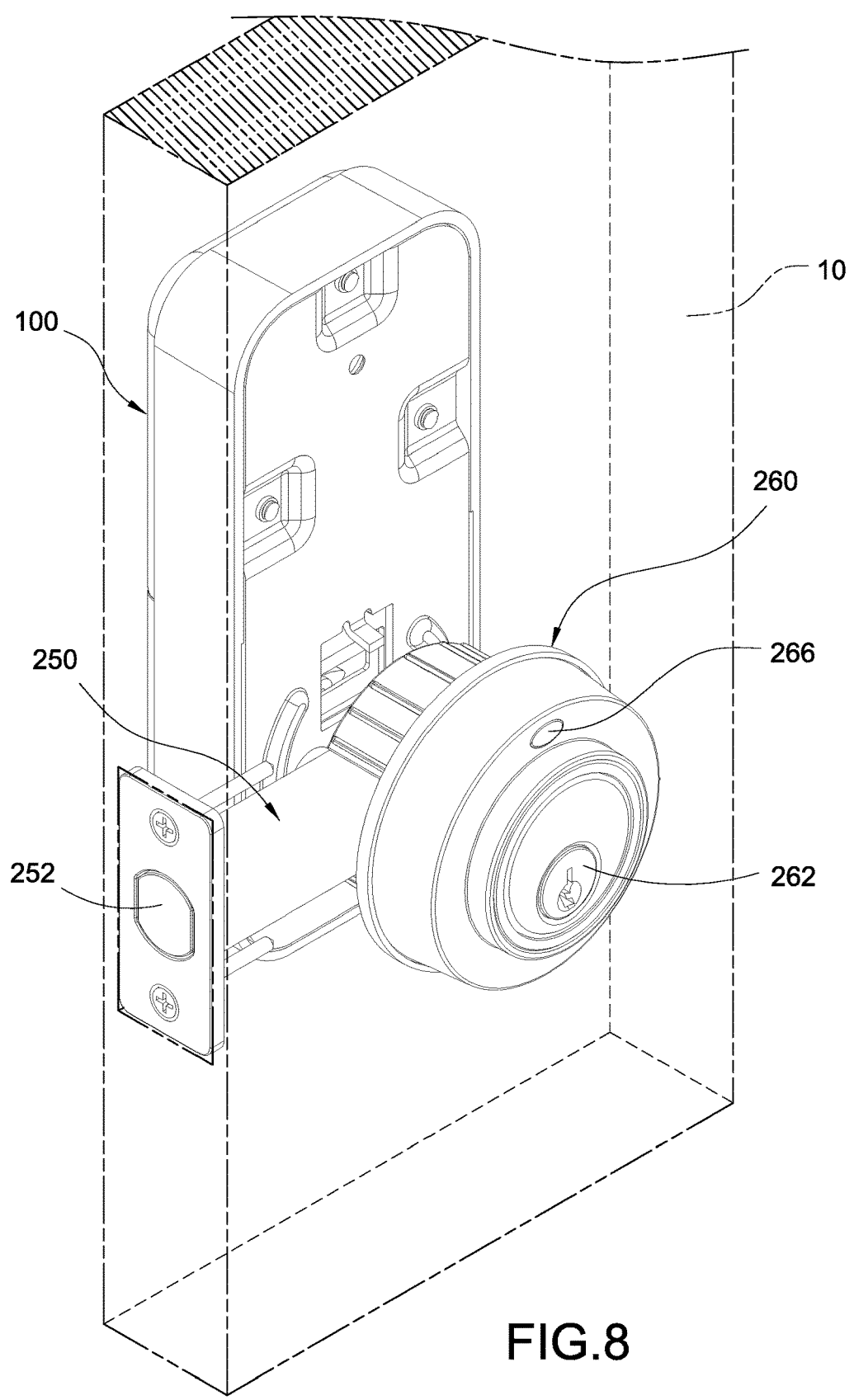
FIG. 8 is a perspective view of the present invention, viewed at another viewing angle, illustrating the release structure of the smart lock in combination with the exterior lock head.

Please refer to FIGS. 7 to 9 which illustrate the present invention in combination with an exterior lock head according to a preferable embodiment. A user unlocks or locks the exterior lock head 260 with a key (not illustrated) from the outside, thereby opening or closing the door 10. In the present embodiment, the exterior lock head 260 connected to the latch unit 250 includes a lock core 262 and a key connection plate 264 rotated by rotation of the lock core 262, wherein the lock core 262 further includes a key hole (not labelled) for insertion of the key. The key connection plate 264 is connected to one end of the latch unit 250 to control movement of the lock tongue at the same time.

When the key is turned to rotate the lock core 262, the key connection plate 264 can control the lock tongue 252 of the latch unit 250 to retract or extend out. The exterior lock head 260 is a conventional technique, so the details of its structure are omitted herein for brevity. In addition, the exterior lock head 260 further includes a sensor 266 for detecting the user outside and awakening the circuit unit 130. The sensor 266 is electrically connected to the circuit unit 130 to activate the circuit board 140 to execute related operations. In other words, the sensor 266 of the present embodiment provides a power-saving effect and is used to activate the circuit unit 130.

It is to be understood that the above descriptions are merely the preferable embodiments of the present invention and are not intended to limit the scope of the present invention. Equivalent changes and modifications made in the spirit of the present invention are regarded as falling within the scope of the present invention.

What is claimed is:

1. A release structure of a smart lock including a housing, the release structure comprising:
    a circuit unit, the circuit unit being accommodated in the housing;
    a drive unit, the drive unit being accommodated in the housing and electrically connected to the circuit unit, the drive unit including at least one push arm pivotally connected to a rotation pivot and enclosing the same; and
    a release element, the release element being disposed on the rotation pivot and including at least one flexible arm, the at least one flexible arm being disposed corresponding to the at least one push arm, the at least one push arm being driven by the drive unit to rotatably contact the at least one flexible arm and cross the same to make the drive unit become idle,
    wherein the at least one flexible arm further includes a connection portion and an abutment portion integrally extending from the connection portion along an axial direction of the rotation pivot, and
    wherein the abutment portion bends outwardly when being pushed against the at least one push arm.

2. The release structure of the smart lock of claim 1, wherein the drive unit further includes a motor, a worm assembly pivotally connected to the motor, and a drive gear enclosing the rotation pivot, wherein the drive gear is engaged with the worm assembly, and the at least one push arm is disposed at one side of the drive gear.

3. The release structure of the smart lock of claim 2, wherein the worm assembly further includes a screw rod connectedly driven by the motor, a driven shaft perpendicular connected to the screw rod, and a first gear disposed on the driven shaft, wherein the first gear is engaged with the screw rod, and the driven shaft and the rotation pivot are disposed parallelly.

4. The release structure of the smart lock of claim 2, wherein the at least one push arm includes a wing portion and a push portion connected to the wing portion, wherein the push portion is in contact with the abutment portion.

5. The release structure of the smart lock of claim 3, wherein the first gear is fixedly connected to a second gear, the second gear engagedly drives the drive gear, and the first gear is sized between the drive gear and the second gear.

6. The release structure of the smart lock of claim 4, wherein the connection portion is perpendicularly connected to the abutment portion, and the wing portion is integrally fixed to one side surface of the drive gear.

7. The release structure of the smart lock of claim 4, wherein one side of the abutment portion corresponding to the push portion is shaped to include a chamfered portion, an arc portion or an inclined surface, so as to facilitate the push portion crossing the abutment portion.

8. The release structure of the smart lock of claim 4, wherein one side of the push portion corresponding to the abutment portion is shaped to include a chamfered portion, an arc portion or an inclined surface, so as to facilitate the push portion crossing the abutment portion.

9. The release structure of the smart lock of claim 1, wherein the circuit unit includes a circuit board, at least one connector disposed at the circuit board, and a plurality of power supply elements connected to the circuit board via the at least one connector.

10. The release structure of the smart lock of claim 1, further comprising a latch unit, the latch unit including a lock tongue and a drive pillar connected to the lock tongue, one end of the drive pillar being connected to the rotation pivot.

11. The release structure of the smart lock of claim 10, further comprising an exterior lock head, the exterior lock head including a lock core and a key connection plate rotated by rotation of the lock core, the key connection plate being connected to one end of the latch unit to control a movement of the lock tongue.

12. The release structure of the smart lock of claim 10, wherein the exterior lock head further includes a sensor, and the sensor is electrically connected to the circuit unit.

* * * * *